(12) United States Patent
Machani et al.

(10) Patent No.: US 8,130,961 B2
(45) Date of Patent: Mar. 6, 2012

(54) METHOD AND SYSTEM FOR CLIENT-SERVER MUTUAL AUTHENTICATION USING EVENT-BASED OTP

(75) Inventors: Salah E. Machani, Thornhill (CA); Konstantin Teslenko, Richmond Hill (CA)

(73) Assignee: Diversinet Corp., Toronto (CA)

( * ) Notice: Subject to any disclaimer, the term of this patent is extended or adjusted under 35 U.S.C. 154(b) by 755 days.

(21) Appl. No.: 12/028,232

(22) Filed: Feb. 8, 2008

(65) Prior Publication Data

US 2010/0031051 A1    Feb. 4, 2010

(30) Foreign Application Priority Data

Jun. 5, 2007   (CA) .................................. 2590989

(51) Int. Cl.
*H04L 9/00*    (2006.01)
(52) U.S. Cl. ........ 380/277; 713/181; 713/176; 713/171; 705/71; 705/75; 380/44; 380/278; 726/19; 726/20
(58) Field of Classification Search .................. 380/259, 380/44, 277, 278; 713/181, 176, 171; 705/71, 705/75; 726/9, 20
See application file for complete search history.

(56) References Cited

U.S. PATENT DOCUMENTS

| | | | | |
|---|---|---|---|---|
| 5,555,307 | A * | 9/1996 | Le Corre et al. | 380/243 |
| 6,928,558 | B1 * | 8/2005 | Allahwerdi et al. | 726/9 |
| 6,947,556 | B1 * | 9/2005 | Matyas et al. | 380/29 |
| 7,009,940 | B2 * | 3/2006 | Vialen et al. | 370/252 |
| 7,096,352 | B2 * | 8/2006 | Kang et al. | 713/152 |
| 7,213,144 | B2 * | 5/2007 | Faccin et al. | 713/153 |
| 7,472,269 | B2 * | 12/2008 | Perkins et al. | 713/155 |
| 7,624,421 | B2 * | 11/2009 | Ozzie et al. | 726/1 |
| 7,668,315 | B2 * | 2/2010 | Quick et al. | 380/264 |
| 2001/0016907 | A1 * | 8/2001 | Kang et al. | 713/152 |
| 2002/0091931 | A1 * | 7/2002 | Quick et al. | 713/182 |
| 2002/0091933 | A1 * | 7/2002 | Quick et al. | 713/182 |
| 2002/0120844 | A1 * | 8/2002 | Faccin et al. | 713/168 |
| 2002/0178358 | A1 * | 11/2002 | Perkins et al. | 713/169 |
| 2003/0033518 | A1 * | 2/2003 | Faccin et al. | 713/153 |
| 2006/0059342 | A1 * | 3/2006 | Medvinsky et al. | 713/168 |
| 2006/0105749 | A1 * | 5/2006 | Han et al. | 455/412.1 |
| 2006/0112283 | A1 * | 5/2006 | Eldridge et al. | 713/193 |
| 2006/0159031 | A1 * | 7/2006 | Vialen et al. | 370/252 |
| 2007/0061566 | A1 * | 3/2007 | Bailey et al. | 713/151 |
| 2007/0220253 | A1 * | 9/2007 | Law | 713/168 |
| 2008/0034216 | A1 * | 2/2008 | Law | 713/183 |
| 2008/0168543 | A1 * | 7/2008 | von Krogh | 726/6 |
| 2009/0150968 | A1 * | 6/2009 | Ozzie et al. | 726/1 |
| 2009/0313687 | A1 * | 12/2009 | Popp et al. | 726/9 |
| 2010/0017604 | A1 * | 1/2010 | Husa | 713/168 |

* cited by examiner

*Primary Examiner* — April Shan
(74) *Attorney, Agent, or Firm* — McMillan LLP

(57) ABSTRACT

The invention comprises a method of authenticating and encrypting a client-server communication, comprising the steps of: a) generating a first one-time password (OTP1) and a second one-time password (OTP2) from a cryptographic token; b) generating an encryption key (K_ENC) and a MAC key (K_MAC) based on OTP2; c) preparing and protecting the client data using K_ENC and K_MAC; d) sending a request message from the client to the server, the request message containing the protected client data, a cryptographic token identifier (TID) and OTP1; e) validating OTP1 at the server, and generating OTP2 at the server upon successful validation; f) deriving K_ENC and K_MAC from OTP2 at the server; g) processing the request message and generating result data h) encrypting the result data using K_ENC and creating a digest using K_MAC; i) sending the encrypted result data to the client; and i) decrypting the result data at the client using K_ENC and verifying the authenticity of the result data using K_MAC.

11 Claims, 2 Drawing Sheets

METHOD AND SYSTEM FOR CLIENT-SERVER MUTUAL AUTHENTICATION USING EVENT-BASED OTP

FIELD OF THE INVENTION

The present invention relates to the field of data encryption and authentication. In particular, it relates to client-server mutual authentication and data encryption using a one-time password (OTP).

BACKGROUND OF THE INVENTION

With the increase in client-server communications, as well as the increase in the value of the data being communicated, there is a corresponding increase in the want and need for secure protocols for those communications. While there are existing data protocols, such as PKI (public-key infrastructure), they are not suitable for all communications and data. Additionally, they often require additional user authentication for use.

One-time passwords (OTPs) are gaining in popularity as a secure method of user authentication, particularly for financial transactions. However, OTPs are not generally found suitable for use in data encryption.

There is a need for a secure protocol that permits both authentication and encryption. Preferably, the secure protocol is based on the OTP framework.

There is also a need for a secure client-server protocol that does not require the existence of a public-key infrastructure.

It is an object of this invention to partially or completely fulfill one or more of the above-mentioned needs.

SUMMARY OF THE INVENTION

The invention comprises a method of authenticating and encrypting a client-server communication, comprising the steps of: a) generating a first one-time password (OTP1) and a second one-time password (OTP2) from a cryptographic token; b) generating an encryption key (K_ENC) and a MAC key (K_MAC) using OTP2 and other seeds; c) preparing and protecting client data using K_ENC and K_MAC; d) sending the request message from the client to the server, the request message containing a cryptographic identifier token (TID), OTP1 and the protected client data; e) validating OTP1 at the server, and generating OTP2 at the server upon successful validation; f) deriving K_ENC and K_MAC using OTP2 at the server; g) processing the request message and generating result data h) encrypting the result data using K_ENC and creating a digest using K_MAC; i) sending the encrypted result data to the client; and j) decrypting the result data at the client using K_ENC and verifying the authenticity of the result data using K_MAC.

The method may further include additional steps of encrypting client request data using K_ENC and MAC data with K_MAC at the client side, and decrypting with K_ENC and authenticating with K_MAC at the server side. Optionally, OTP1 can be validated by an external validation service.

K_ENC and K_MAC may be derived using standard passphrase-based key derivation algorithms.

The invention further includes a data encryption and authentication protocol incorporating the above method.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

The inventive system and method presented herein comprises a client-server protocol for secure data interchange using one-time password (OTP) cryptographic tokens to provide mutual authentication between the client and server, as well as ensuring the authenticity, security and integrity of the data. The system extends the OTP framework beyond user authentication to encompass more robust security and encryption methods by using the OTP token to additionally generate encryption keys and MAC (Message Authentication Code) keys. The resulting method provides for authentication and data encryption with or without the existence of a public-key infrastructure.

Figure 1:
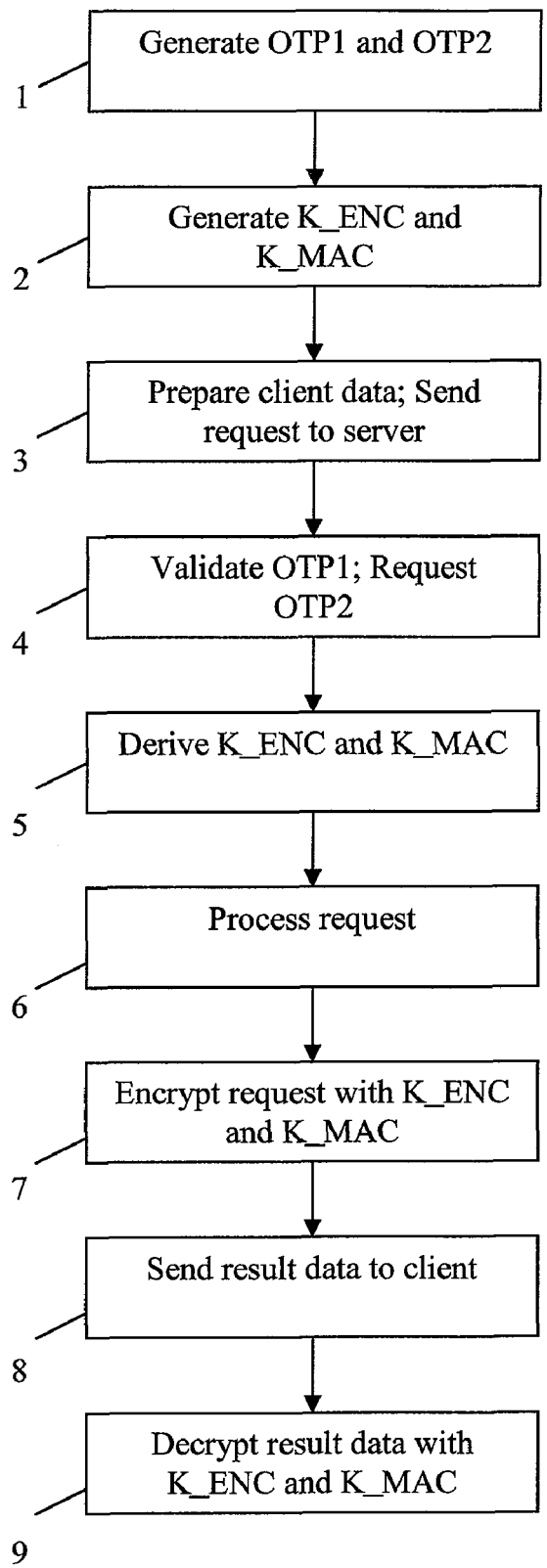
FIG. 1 is a flow chart outlining a preferred method of the present invention.
Figure 2:
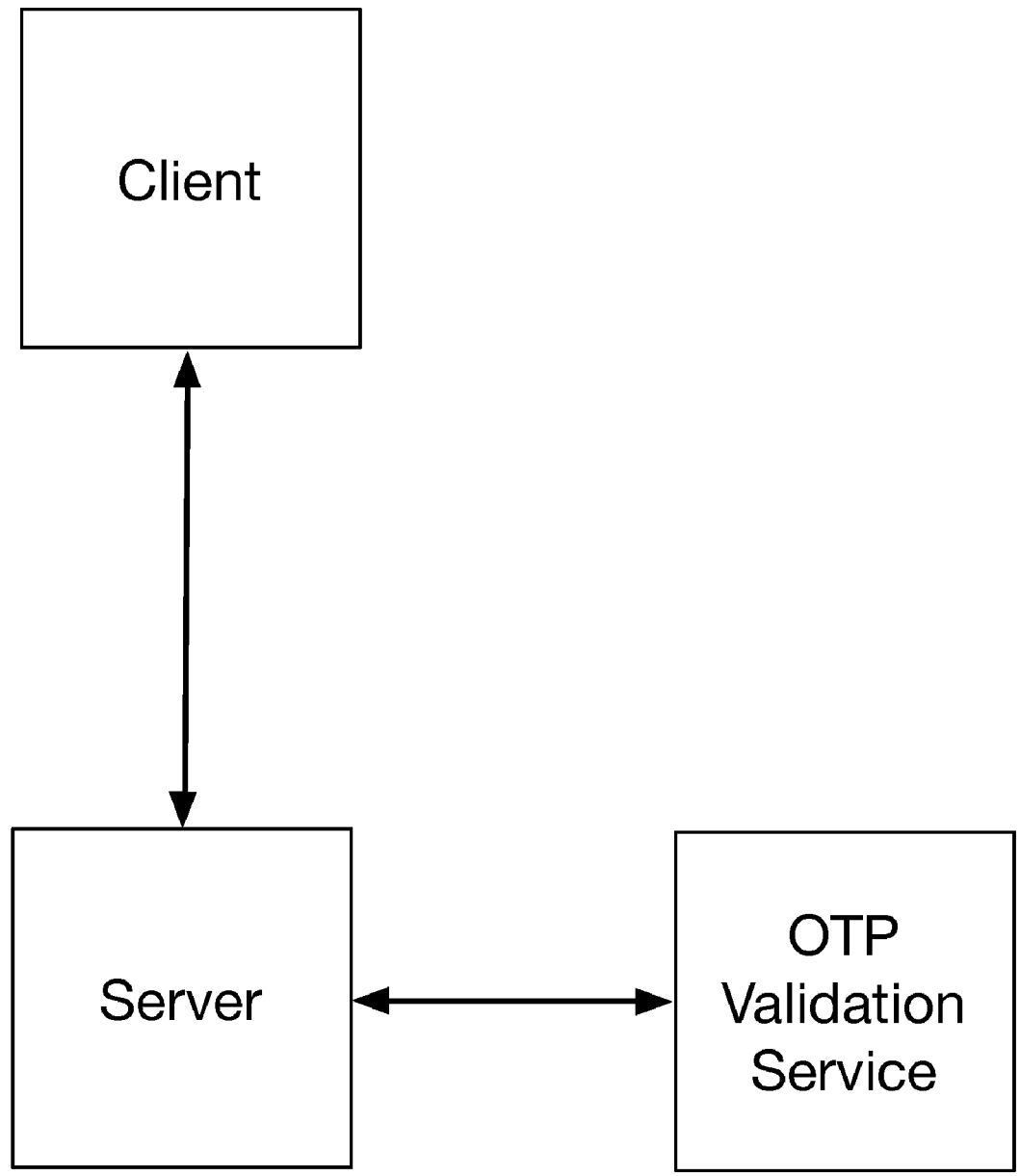
FIG. 2 shows a system for authenticating and encrypting a client-server communication in accordance with and embodiment of the invention.

The process of the method is shown in the flowchart of FIG. 1. First (Step1), the client-side application generates the current OTP, OTP1, based on the OTP protocol and system in place i.e. cryptographic token, and generates the next OTP, OTP2 in the same manner. OTP1 and OTP2 are generated by any event and/or counter based OTP generation algorithm. An example is where OTP1 and OTP2 are generated using a HMAC (Hashed Message Authentication Code)-based OTP algorithm, such as that described in RFC 4226 ("HOTP: An HMAC-Based One-Time Password Algorithm").

At the next step (Step 2), the client application derives an encryption key, K_ENC, and a MAC computation key, K_MAC, from OTP2 and other seeds. K_ENC and K_MAC are derived using a key derivation function, such as PKDF2 (Password-Based Key Derivation Function). A SHA1-MAC (Secure Hash Algorithm) algorithm is preferred for MAC computation, although any "keyed" hash function can be used.

With all the keys created, the client prepares and protects the client data using K_ENC and K_MAC, then sends a request message to the server (Step 3). The message contains a cryptographic token identifier (TID) and OTP1. Optionally, encrypted request data using K_ENC and/or MAC data using K_MAC can also be sent as part of the message.

The server receives the message and validates OTP1 (Step 4) for the TID. OTP1 can be validated either internally, or by an external OTP validation service. If an external service is used, the link must be secure. After OTP1 is validated, the server requests OTP2.

Next (Steps 5 and 6), the server uses OTP2 to derive K_ENC and K_MAC (if necessary). Once derived, the server uses K_ENC to decrypt the client data in the message (if present) and K_MAC to verify the integrity and authenticity of the data (if present).

Once the client data is verified and decrypted using K_ENC and K_MAC, the server processes the request from the client, and encrypts the resulting data (Step 7) using K_ENC and generates a digest using K_MAC. The encrypted result data is then sent to the client (step 8).

Lastly (Step 9), the client decrypts and verifies the authenticity of the result data using K_ENC and K_MAC as described above.

This method represents a two-pass protocol, as the client sends OTP1 in the first pass as an identifier, and the result data is returned from the server using OTP2. The request data is cryptographically protected using the K_ENC and K_MAC keys derived from OTP2.

Sample Code

Definitions:

||—String concatenation

[x]—Optional element of value x

R_C—Pseudorandom value (chosen by client)

dsLen—Desired key length

KDF—Key derivation function

OTP1 and OTP2 are generated by the client application using a HMAC-based One-Time Password algorithm (HOTP) from a cryptographic token (K_TOKEN) and a counter value (current_counter).

OTP1=HOTP(K_TOKEN, current_counter)

OTP2=HOTP(K_TOKEN, current_counter+1)

K_ENC is derived from OTP2 using a key derivation function such as PKDF2 and a passphrase string (a service specific static data string e.g. "Data Encryption"). Using PKDF2 as the key derivation function, R_C is the salt.

K_ENC=KDF(OTP2||"Data Encryption"[,R_C][, count][,dsLen])

K_MAC is derived from OTP2 and a passphrase string (a service specific static data string e.g. "MAC Computation") in a similar fashion to K_ENC. Preferably, a SHA1-MAC algorithm is used to generate MAC computation.

K_MAC=KDF(OTP2||"MAC computation"[,R_C][, count][,dsLen])

This concludes the description of a presently preferred embodiment of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A method of authenticating and encrypting a client-server communication, comprising:
    a) generating, by a hardware client device, a first one-time password (OTP1) and an immediately subsequent to said OTP1 second one-time password (OTP2) from a cryptographic token;
    b) generating an encryption key (K_ENC) and a MAC (Message Authentication Code) key (K_MAC) based on said OTP2;
    c) protecting client data by encrypting said client data using said K_ENC and generating a digest of said client data using said K_MAC;
    d) sending a request message from the hardware client device to a hardware server computer, the request message containing the protected client data, a cryptographic token identifier (TID) and said OTP1;
    e) validating said OTP1 at the hardware server computer, and regenerating said OTP2 at the hardware server computer upon successful validation of said OTP1;
    f) regenerating said K_ENC and said K_MAC from said OTP2 at the hardware server computer;
    g) decrypting and authenticating the protected client data using said K_ENC and said K_MAC respectively at the hardware server computer;
    h) processing the request message and generating result data;
    i) encrypting the result data using said K_ENC and creating a digest of said result data using said K_MAC;
    j) sending the encrypted result data to the hardware client device; and
    k) decrypting the result data at the hardware client device using said K_ENC and verifying the authenticity of the result data using said K_MAC.

2. The method of claim 1, wherein the step of validating said OTP1 takes place internally at the hardware server computer.

3. The method of claim 1, wherein the step of validating said OTP1 takes place at a validation service external to the hardware server computer.

4. The method of claim 1, wherein said K_ENC and said K_MAC are derived using PKDF2 (Password-Based Key Derivation Function).

5. The method of claim 1, wherein said K_MAC is derived using a SHA-1 (Secure Hash Algorithm) MAC algorithm.

6. The method of claim 1, wherein said OTP1 and said OTP2 are derived using a HMAC-based (Hashed Message Authentication Code) OTP (One-Time Password) algorithm.

7. A system for authenticating and encrypting a client-server communication, comprising:
    a hardware server computer;
    said hardware server computer configured to receive a request message from a client, the request message containing protected client data, a cryptographic identifier token (TID) and a first one-time password (OTP1), said protected client data being encrypted using an encryption key (K_ENC) and having a digest created using a MAC (Message Authentication Code) key (K_MAC), both said K_ENC and said K_MAC being generated from a cryptographic token by said client using an immediately subsequent to said OTP1 second one-time password (OTP2),
    said hardware server computer further configured to validate said OTP1 and regenerate said OTP2 upon successful validation of said OTP1, regenerate said K_ENC and said K_MAC from said OTP2, decrypt and authenticate the protected client data using said K_ENC and said K_MAC respectively, process the request message and generate result data, encrypt the result data using said K_ENC, create a digest of the result data using said K_MAC, and send said encrypted result data to said client.

8. The system of claim 7, wherein said hardware server computer validates said OTP1 via an external validation service.

9. The system of claim 7, wherein said K_ENC and said K_MAC are derived using PKDF2 (Password-Based Key Derivation Function).

10. The system of claim 7, wherein said K_MAC is derived using a SHA-1 (Secure Hash Algorithm) MAC algorithm.

11. The system of claim 7, wherein said OTP1 and said OTP2 are derived using a HMAC-based (Hashed Message Authentication Code) OTP (One-Time Password) algorithm.

* * * * *